US 6,666,967 B1

United States Patent
Oyabu

(10) Patent No.: US 6,666,967 B1
(45) Date of Patent: Dec. 23, 2003

(54) DEFOAMING AND AIR-WATER TREATING DEVICE

(75) Inventor: Toshiharu Oyabu, Nagoya (JP)

(73) Assignee: I.B.E. Co., Ltd., Aichi (JP)

(*) Notice: Subject to any disclaimer, the term of this patent is extended or adjusted under 35 U.S.C. 154(b) by 0 days.

(21) Appl. No.: 10/129,586

(22) PCT Filed: Nov. 8, 1999

(86) PCT No.: PCT/JP99/06215
§ 371 (c)(1),
(2), (4) Date: May 7, 2002

(87) PCT Pub. No.: WO01/34522
PCT Pub. Date: May 17, 2001

(51) Int. Cl.[7] .............................. B01D 19/02
(52) U.S. Cl. .................... 210/218; 210/220; 210/221.2; 210/222; 95/242; 95/245; 96/176; 261/76; 261/77; 261/121.1
(58) Field of Search ....................... 95/242, 245; 96/176; 261/76, 77, 121.1; 210/218, 220, 221.1, 221.2, 222, 695

(56) References Cited

U.S. PATENT DOCUMENTS 5,030,362 A * 7/1991 Da Silva et al. .............. 261/76

FOREIGN PATENT DOCUMENTS

JP  58156506 U  * 10/1983
JP  08309103 A  * 11/1996  ............ B01D/19/02

* cited by examiner

Primary Examiner—David A. Reifsnyder
(74) Attorney, Agent, or Firm—Cooper & Dunham LLP; Donald S. Dowden

(57) ABSTRACT

An object of the present invention is to efficiently remove foam produced in water by the aeration. Further, another object of the present invention is to improve water and air. Said objects can be attained by providing a foam removing apparatus consisting of a core having a spiral groove on its surface and a cylinder in which said core is inserted, and an air-water treating apparatus consisting of an outer cylinder, an inner cylinder inserted in said outer cylinder, a block having gas permeability inserted in said inner cylinder, and a core inserted in said inner cylinder and disposed above said permeable block, to which block an air introducing pipe connecting from the outside, and on the surface of said core a spiral groove being formed.

1 Claim, 4 Drawing Sheets

DEFOAMING AND AIR-WATER TREATING DEVICE

FIELD OF THE INVENTION

The present invention relates to a foam removing apparatus removing foam produced in water by the aeration and an air-water treating apparatus using said foam removing apparatus.

BACKGROUND OF THE INVENTION

When the aeration is effected on water, clusters of water become fine so that the taste and bioactivity of water are improved, on the other hand, the amount of minus ions having a preferable effect on the human body increases in the air. Hitherto, as shown in FIG. 7, an air contacting apparatus (31) consisting of a cylinder (32) wherein a block having gas permeability (33) made of such as sintered ceramics is inserted, the end of an air introducing pipe (34) connecting to said block (33).

The problem of said conventional air contacting apparatus (31) is that foam overflows from the upper end of said cylinder (32) when the clusters of water become fine and as a result, the surface tension of water becomes lower.

DESCRIPTION OF THE PRIOR ART

Hitherto, to remove foam produced by the aeration, the anti-foaming agent such as long-chain saturated alcohol, silicone polymer emulsion and the like is added to water. However, when such an anti-foaming agent is added, water treated by the aeration becomes unsuitable for drinking, and it is feared that supplying said water to plants may damage said plants.

SUMMARY OF THE INVENTION

Accordingly, an object of the present invention is to remove foam produced in a liquid such as water and the like without addition of said anti foaming-agent.

Another object of the present invention is to provide a water treating apparatus which treats water by the aeration to produce fine clusters of water, and at the same time increase the amount of minus ions in the air.

Said objects can be attained by providing a foam removing apparatus consisting of a core having a spiral groove on its surface and a cylinder wherein said core is inserted, and an air-water treating apparatus consisting of an outer cylinder, an inner cylinder inserted in said outer cylinder, a block having gas permeability inserted in said inner cylinder, and a core inserted in said inner cylinder and disposed above said permeable block, to which block an air introducing pipe connecting from the outside, and on the surface of said core a spiral groove being formed.

BRIEF DESCRIPTION OF THE DRAWINGS

FIG. 1 is a side sectional view of the air-water treating apparatus.

FIG. 2 is a perspective view of the supporting base.

FIG. 3 is a perspective view of the core.

FIG. 4 is a side sectional view of the magnetic field generator.

FIG. 5 is a perspective view of the inside of the magnetic field generator.

DETAILED DESCRIPTION

Figure 1:
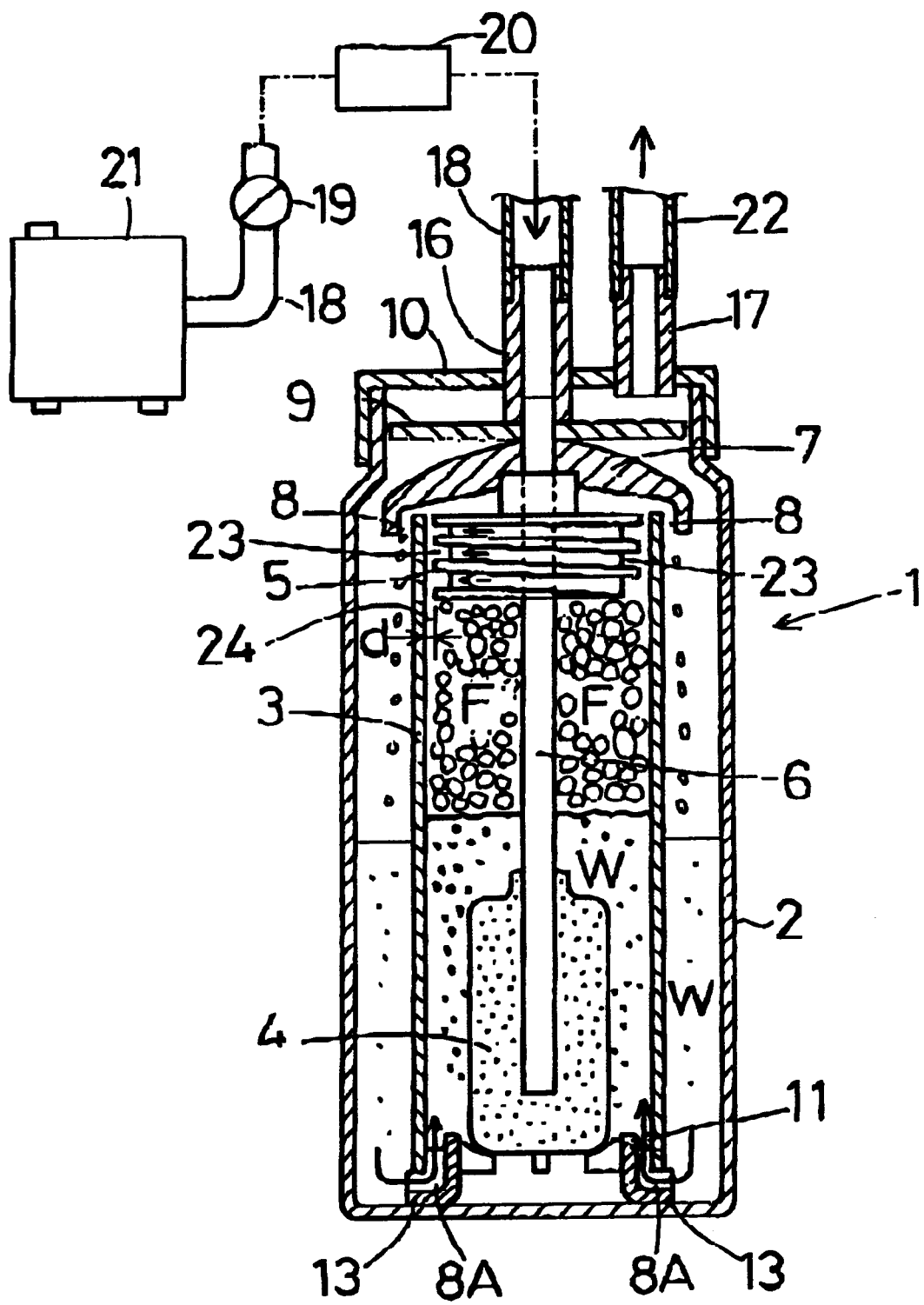
FIGS. 1 to 5 relate to an embodiment of the present invention.
Figure 2:
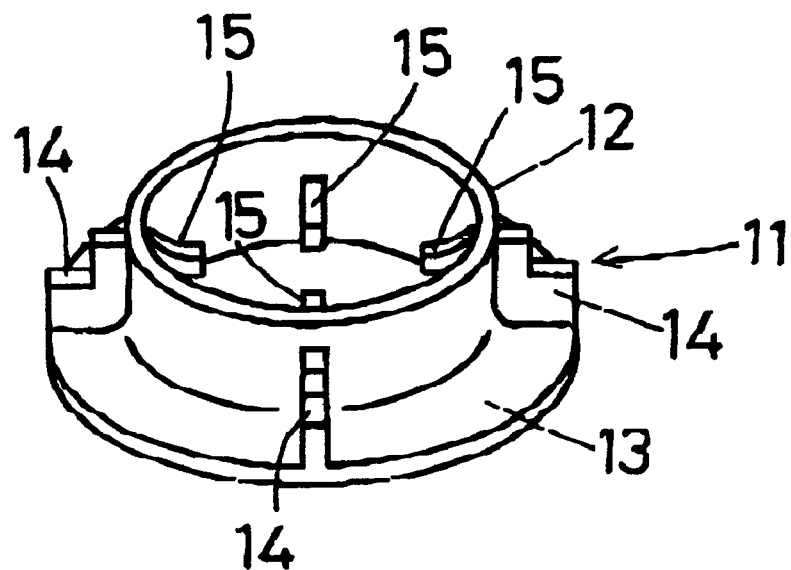

FIGS. 1 to 5 show an embodiment of the present invention. An air-water treating apparatus (1) consists of an outer cylinder (2), an inner cylinder (3) inserted in said outer cylinder (2) and supported at its lower end by a supporting base (11), a block having gas permeability (4) inserted in said inner cylinder (3), a core (5) inserted in said inner cylinder (3) and disposed above said permeable block (4), an air introducing pipe (6) whose end connected to said block (4), a guiding lid (7) disposed above said inner cylinder (3) through a narrow space (8), a cover plate (9) disposed above said guiding lid (7), and a cap (10) closing an upper opening of said outer cylinder (2). As shown in FIG. 2, said supporting base (11) consists of a cylindrical part (12), a ring-shaped flange part (13) projecting from the underside of said cylindrical part (12), a plural number of outer ribs (14) attached between said cylindrical part (12) and said ring-shaped flange part (13), and a plural number of inner ribs (15) projecting from the inner surface of said cylindrical part (12). The lower end of said inner cylinder (3) is supported on said outer ribs (14) of said supporting base (11) so that a space (8A) between the lower end of said inner cylinder (3) and said supporting base (11) is formed to communicate with said outer cylinder (2). Further, a connecting tube (16) to connect said air introducing pipe (6) and a connecting tube (17) to connect an exhausting pipe (22) are attached penetratingly to said cap (10) of said outer cylinder (2). Said connecting tube (16) supports said cover plate (9) and said guiding lid (7) at its lower end, and said air introducing pipe (6) is inserted in said connecting tube (16). Further one end of an air inlet pipe (18) equipped with a valve (19) and a magnetic field generator (20) connects to the upper end of said connecting tube (16) and the other end of said air inlet pipe (18) connects to a ventilator (21). On the other hand, said exhausting pipe (22) is connected to said connecting tube (17).

Figure 3:
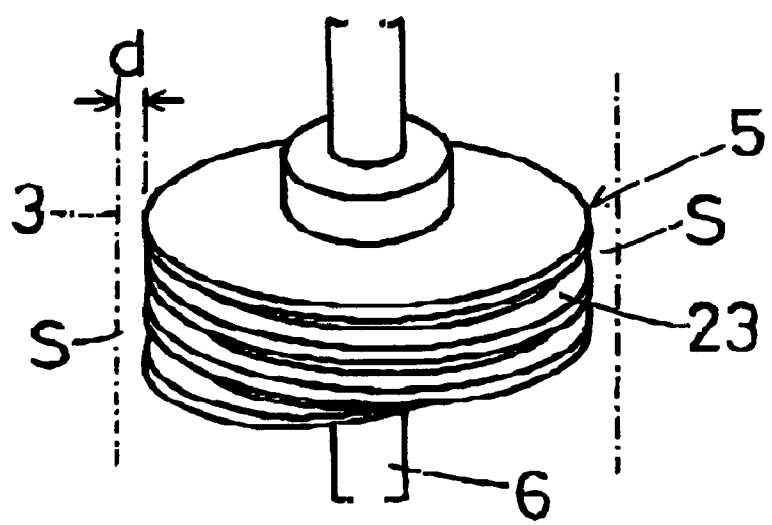

As shown in FIG. 3, a spiral groove (23) is formed on the surface of said core (5) and a narrow space (24) is formed between the surface of said core (5) and the inner surface of said inner cylinder (3). The width d of said narrow space (24) is preferably in a range of 0.5 to 0.7 mm.

Figure 4:
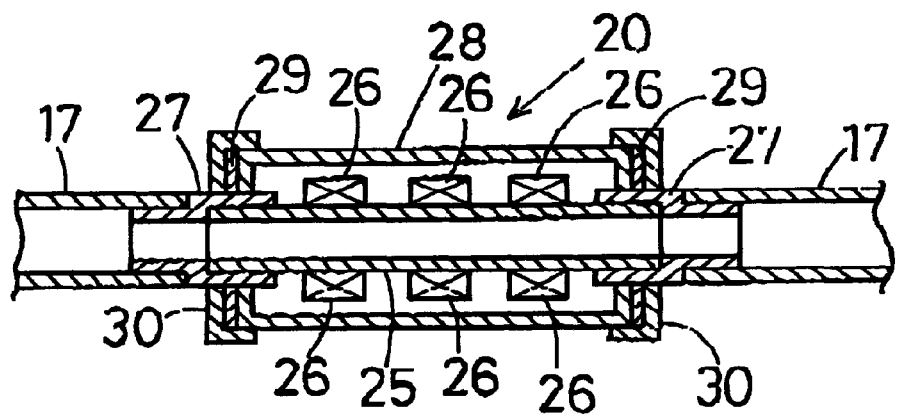
Figure 5:
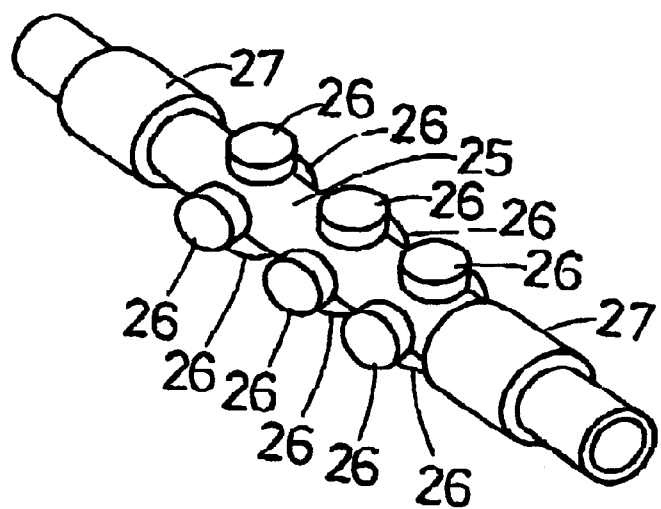
Figure 6:
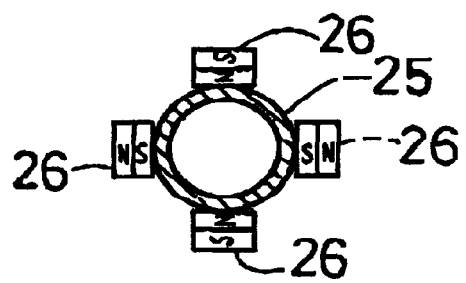
FIG. 6 is a side sectional view of the inside of the magnetic field generator.
Figure 7:
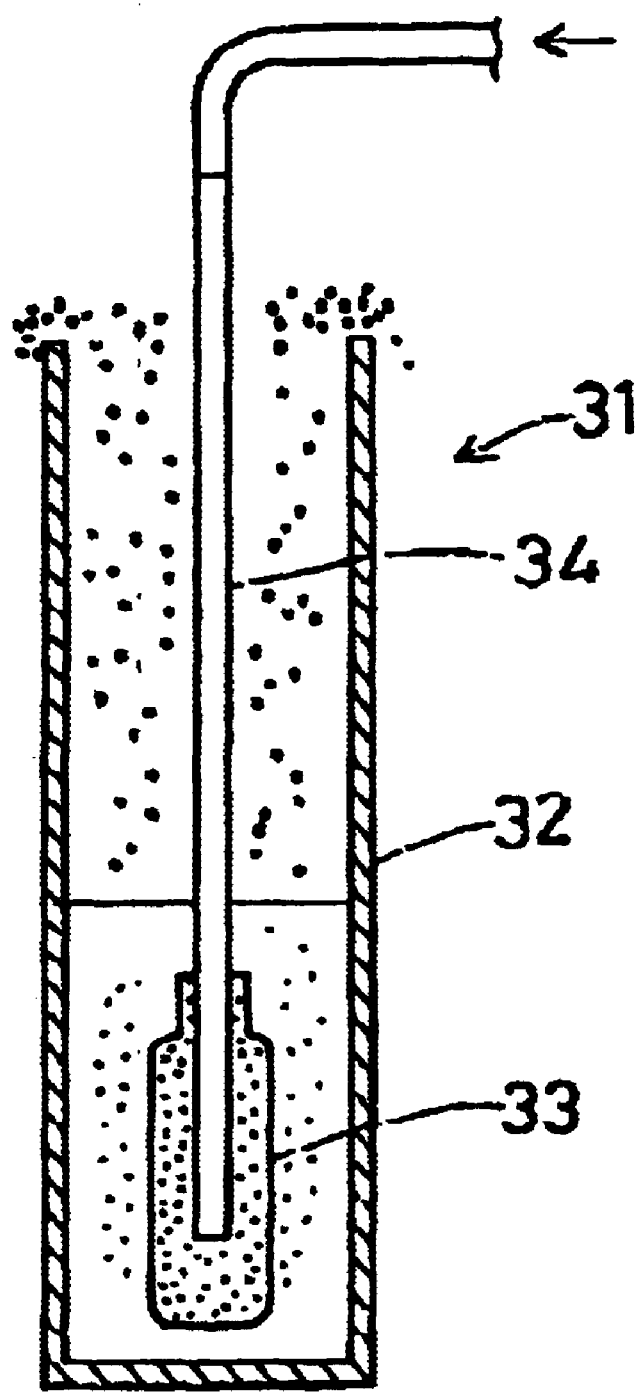
FIG. 7 is a side sectional view to illustrate the prior art.

As shown in FIGS. 4 to 6, said magnetic field generator (20) consists of a pipe (25), a plural number of permanent magnets (26) surrounding said pipe (25) (3 sets arranged along the axle of said pipe (25), each set has 4 magnets surrounding said pipe (25)), a pair of connecting tubes (27,27) respectively connecting to the both ends of said pipe (25), a cylindrical metal housing (28) covering said pipe (25), a pair of metal seal plates (29,29) respectively attached to the both sides of said cylindrical metal housing (28), and a pair of metal caps (30,30) fixing said metal seal plates (29,29) from the outside to said cylindrical metal housing (28). Thus, said cylindrical metal housing (28), said metal seal plates (29), and said metal caps (30) perfectly contain and shield magnetic lines of force generated from said permanent magnets (26).

Said magnets (26) may be permanent magnets or electromagnets, and as shown in FIG. 6, it is preferable to arrange said magnets (26) of each set in such a way that North and South poles of said magnets (26) are alternately arranged. And the total amount of magnetic field strength of said magnets (26) is 4200 gausses.

Said block having gas permeability (4) is made of, for example, sintered ceramics, usable ceramics being such as silica, alumina, zirconia, titania and the like; a sintered thermoplastic resin, a usable thermoplastic resin being such as polystyrene, polymethylmethacrylate, polyethylene, polypropylene and the like; and a sintered metal, a usable metal being such as aluminum, iron, stainless steel and the like. The pore diameter of said block having gas permeability (4) is ordinarily in a range of 150 to 250 mm.

Further the width of said space (8) between said inner cylinder (3) and said guiding lid (7) is generally to be in a range of about 1 to 3 mm and the ratio of the diameter of said inner cylinder (3) to that of said outer cylinder (2) is generally to be in a range of about 1:1.3 to 1:1.6.

In said air-water treating apparatus, said inner cylinder (3) and said outer cylinder (2) are respectively filled with water. Then said valve (19) of said air inlet pipe (18) is opened to send air to said air inlet pipe (18) from said ventilator (21) and said air is blown into water layer W in said inner cylinder (3) through said block having gas permeability (4) for the aeration. Said air passes through said magnetic field generator (20) to produce minus ions in said air by the effect of magnetic field. The blowing rate of the air is ordinarily in a range of 30 to 40/minute.

The clusters of said water become fine by said aeration and the surface tension of said water becomes lower so that foam F is produced on the upper part of the water layer W in said inner cylinder (3). Said foam F rises upward and is introduced into said spiral groove (23) of said core (5) at the upper end of said inner cylinder (3), and said foam F is crushed by the contraction effect of said spiral groove (23), then the water overflows into said outer cylinder (2) through said space (8) between said inner cylinder (3) and said guiding lid (7).

When said foam F is crushed by the contraction effect in said spiral groove (23) of said core (5), minus ions are produced more efficiently in said water, and said water layer W is accumulated in the bottom of said outer cylinder (2) and said water of said water layer W circulates into said inner cylinder (3) through said space (8A) at the lower end of said inner cylinder (3). On the other hand, the air is exhausted to the outside from said outer cylinder (2) through said exhausting pipe (22).

After said treatment of air and water for 5 minutes, the size of the clusters of water was measured with $^{17}$O-NMR spectral analysis and the result was that $^{17}$O-NMR spectral line width was 52.3, the amount of minus ions was about 3000/, and the amount of plus ions was about 1000/ in the air collected at the place 1 m apart from the nozzle of said exhausting pipe (22). On the other hand, in the case of the untreated water $^{17}$O-NMR spectral line width was 93.4, the amount of minus ions in the air was about 320/, and the amount of plus ions in the air was about 2120/.

The water treated as described above had good taste, and the air was purified to contain a lot of minus ions. When said air came in contact with the diseased parts of the human body, it was confirmed that said air had curative effects on muscle pains, toothaches, skin irritations, headaches, asthma, empyema and the like.

In this embodiment, an untreated block was used for said block having gas permeability (4). However, said permeable block (4) may be treated with a ferric-ferrous iron. To treat said block (4) with said ferric-ferrous iron, said block (4) is dipped in a solution of said ferric-ferrous iron or said block (4) is made to contact with air passing through said ferric-ferrous iron solution.

The above-said ferric-ferrous iron solution is prepared in the following two ways.

(1) Ferric chloride (1 g) is added to 12N caustic soda aqueous solution (5 ml) and stirred. The dissolved solution is kept for 5 or more hours at room temperature. Said solution is neutralized at about pH7 with 12N aqueous HCl. The neutralized solution is filtered with paper (No. 5C) and concentrated in vacuum to obtain crystal. The crystal extracted is vacuum-dried in a desiccator. The resulting dried material is added to 10 ml of mixed solvent of isopropanol and water (80:20 weight ratio). The resulting solution is filtered with filter paper (No. 5C), after that, is vacuum-concentrated, cleared of the solvent and dried. The above-said process of extraction, concentration and drying is continued several times to obtain fine crystal of activated iron chloride. Solution (2 ppm) is prepared by diluting said crystal with distilled water.

(2) Ferrous sulfate (1 g) is added to 12N HCl aqueous solution (5 ml) and stirred. The dissolved solution is filtered with filter paper (No. 5C) and then vacuum-concentrated to obtain crystal. The crystal extracted is vacuum-dried in a desiccator. The resulting dried material is added to 10 ml of mixed solvent of isopropanol and water (80:20 weight ratio). The resulting solution is filtered with filter paper (No. 5C), after that, is vacuum-concentrated, cleared of the solvent and dried. The above-said process of extraction, concentration and drying is continued several times to obtain fine crystal of activated iron chloride. Solution (2 ppm) is prepared by diluting said crystal with distilled water.

When the block having gas permeability (4) treated with the ferric-ferrous ions was-used, $^{17}$O-NMR spectral line width of the treated water was 49.6 and the amount of minus ions in the treated air was about 3400/.

What is claimed is:

1. An air-water treating apparatus consisting of an outer cylinder, and inner cylinder inserted in said outer cylinder, a block having gas permeability inserted in said inner cylinder, and a core inserted in said inner cylinder and disposed above said permeable block, to which block an air introducing pipe is connected from the outside, and on the surface of said core a spiral groove is formed.

* * * * *